United States Patent
Yang et al.

(10) Patent No.: US 9,396,000 B2
(45) Date of Patent: Jul. 19, 2016

(54) METHODS AND SYSTEMS TO PERMIT MULTIPLE VIRTUAL MACHINES TO SEPARATELY CONFIGURE AND ACCESS A PHYSICAL DEVICE

(75) Inventors: Xue Yang, Arcadia, CA (US); Hsin-Yuo Liu, Fremont, CA (US); Praveen Gopalakrishnan, Hillsboro, OR (US); Sebastian Schoenberg, Hillsboro, OR (US); Sanjay Kumar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 812 days.

(21) Appl. No.: 12/978,555

(22) Filed: Dec. 25, 2010

(65) Prior Publication Data
US 2011/0321042 A1    Dec. 29, 2011

Related U.S. Application Data

(60) Provisional application No. 61/358,671, filed on Jun. 25, 2010.

(51) Int. Cl.
G06F 9/46    (2006.01)
G06F 9/44    (2006.01)
G06F 9/54    (2006.01)
(Continued)

(52) U.S. Cl.
CPC .......... *G06F 9/4411* (2013.01); *G06F 9/45558* (2013.01); *G06F 9/545* (2013.01); *G06F 13/387* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS 7,272,831 B2    9/2007 Cota-Robles et al.
7,478,173 B1 *  1/2009 Delco ........................ 709/250
(Continued)

FOREIGN PATENT DOCUMENTS

CN    1862517 A     11/2006
JP    2008-146566 A  6/2008
(Continued)

OTHER PUBLICATIONS

Office Action received for Japanese Patent Application No. 2011-141735, mailed on Jun. 4, 2013, 4 paged of office action including 2 pages of English Translation.
(Continued)

*Primary Examiner* — Wissam Rashid
(74) *Attorney, Agent, or Firm* — Garrett IP, LLC

(57) ABSTRACT

Methods and systems to permit multiple virtual machines (VMs) to separately configure and access a physical resource, substantially outside of a virtual machine monitor (VMM) that hosts the VMs. Each of a plurality of virtual machines (VMs) may access and configure the physical device through corresponding instances of a device driver that exposes controllable functions of the physical device within the VMs. VM-specific configuration parameters and connection information may be maintained for each of the VMs, outside of a VMM, to reconfigure or virtualize the physical device for each of the VMs with the corresponding VM-specific configuration parameters and connection information. Physical device virtualization augmentation features may be implemented within a combination of a physical device controller and a host device driver that executes outside of the VM.

15 Claims, 10 Drawing Sheets

(51) Int. Cl.
G06F 9/455 (2006.01)
G06F 13/38 (2006.01)

(56) References Cited

U.S. PATENT DOCUMENTS

| | | | |
|---|---|---|---|
| 7,752,635 | B2 | 7/2010 | Lewites |
| 7,818,808 | B1 | 10/2010 | Neiger et al. |
| 7,830,882 | B2 | 11/2010 | Johnson |
| 8,392,625 | B2 | 3/2013 | Gopalakrishnan et al. |
| 8,504,703 | B2 | 8/2013 | Vega et al. |
| 2004/0015966 | A1* | 1/2004 | MacChiano et al. ............ 718/1 |
| 2006/0245533 | A1 | 11/2006 | Rostampour |
| 2006/0294517 | A1 | 12/2006 | Zimmer et al. |
| 2007/0101323 | A1 | 5/2007 | Foley et al. |
| 2007/0189308 | A1* | 8/2007 | Tchigevsky et al. .......... 370/396 |
| 2009/0037941 | A1* | 2/2009 | Armstrong et al. ........... 719/328 |
| 2009/0183173 | A1 | 7/2009 | Becker et al. |
| 2009/0222558 | A1 | 9/2009 | Xu et al. |
| 2009/0292858 | A1 | 11/2009 | Lambeth et al. |
| 2011/0321065 | A1 | 12/2011 | Gopalakrishnan et al. |

FOREIGN PATENT DOCUMENTS

| | | |
|---|---|---|
| JP | 2009-157731 A | 7/2009 |
| JP | 2009151767 A | 7/2009 |
| JP | 2010-066931 A | 3/2010 |
| JP | 2011014023 A | 1/2011 |
| JP | 2011519089 A | 6/2011 |
| RU | 2265880 C2 | 12/2005 |
| RU | 2374675 C2 | 11/2009 |
| WO | 2007/082097 A2 | 7/2007 |
| WO | 2008/124244 A1 | 10/2008 |
| WO | 2008/126145 A1 | 10/2008 |
| WO | 2009/133015 A1 | 11/2009 |
| WO | 2011/162880 A2 | 12/2011 |
| WO | 2011/163033 A2 | 12/2011 |
| WO | 2011/162880 A3 | 3/2012 |
| WO | 2011/163033 A3 | 4/2012 |

OTHER PUBLICATIONS

International Search Report and Written Opinion received for Patent Application No. PCT/US/2011/035926, mailed on Jan. 9, 2012, 9 pages.
Dong, et al. "SR-IOV Networking in Xen: Architecture, Design and Implementation", WIOV'08 Proceedings of the First conference on I/O virtualization, USENIX Association Berkeley, CA, USA, 2008, 7 Pages.
Lowe, Scott. "What is SR-IOV?", Blog.scottlowe.org, The weblog of an IT pro specializing in virtualization, storage, and servers, Dec. 2, 2009, 4 Pages. Available at: http://blog.scottlowe.org/2009/12/02/what-is-sr-iov/.
International Preliminary Report on Patentability and Written Opinion received for PCT Patent Application No. PCT/US/2011/035926, mailed on Jan. 10, 2013, 7 pages.
International Search Report and Written Opinion received for Patent Application No. PCT/US2011/040549, mailed on Feb. 28, 2012, 9 pages.
Office Action received for Japanese Patent Application No. 2011-141735, mailed on Jan. 8, 2013, 6 pages of Office Action including 3 pages of English Translation.
Office Action received for Japanese Patent Application No. 2011-141735, mailed on Sep. 24, 2013, 2 pages of Office Action and 2 pages of English translation (Total 4 pages).
Notice of Allowance received for Japanese Patent Application No. 2011-141735, mailed on Mar. 18, 2014, 3 pages of Notice of grant only.
Office Action Received for Russian Patent Application No. 2012157524 mailed on Apr. 15, 2014, 6 pages of Office Action and 3 pages of English Translation.
Office Action Received for Chinese Patent Application No. 201110186550.3, mailed on Apr. 14, 2014, 7 pages of Office Action and 13 pages of English Translation.
Notice of Grant received for Japanese Patent Application No. 2013-516616, mailed on Dec. 10, 2013, 3 pages of Notice of Grant only.
International Preliminary Report on Patentability and Written Opinion received for PCT Patent Application No. PCT/ US2011/040549, mailed on Jan. 10, 2013, 6 pages.
Office Action received for Chinese Patent Application No. 201110186550.3, mailed on Oct. 8, 2014, 7 pages of Office Action including 4 pages of English Translation.
Office Action received for Russian Patent Application No. 2012151261, mailed on Nov. 27, 2014, 4 pages of English Translation and 5 pages of Russian Office Action.
Notice of Allowance received for Russian Patent Application No. 2012157524, mailed on Sep. 2, 2014, 12 pages of Russian Notice of Allowance only.
European Search Report for Application No. 11798554.9 mailed on Aug. 27, 2014, 7 pages.
Extended European Search Report received for European Patent Application No. 11798650.5, mailed on Aug. 27, 2014, 6 Pages.
Office Action received for European Patent Application No. 11798554.9, mailed on Jan. 28, 2016, 4 pages.
Office Action received for European Patent Application No. 11798650.5, mailed on Jan. 28, 2016, 4 pages.
Office Action received for Chinese Patent Application No. 201180031568.4, mailed on Feb. 5, 2016, 5 pages of English Translation and 3 pages of Chinese Office Action.
Office Action received for Chinese Patent Application No. 201180031568.4, mailed on May 29, 2015, 6 pages of Chinese Office Action only.

* cited by examiner

METHODS AND SYSTEMS TO PERMIT MULTIPLE VIRTUAL MACHINES TO SEPARATELY CONFIGURE AND ACCESS A PHYSICAL DEVICE

CROSS REFERENCE

This application claims the benefit of U.S. Provisional Patent Application No. 61/358,671, filed Jun. 25, 2010, titled "Wireless Virtualization," which is incorporated herein by reference in its entirety.

BACKGROUND

A computer system may include a virtual machine monitor (VMM) to host one or more guest operating systems.

The VMM may arbitrate access to resources of the computer system amongst the guest operating systems. The VMM may present a virtual interface or an abstraction of the resources to the guest operating systems. A guest operating system and corresponding virtualized resources and interfaces are referred to herein as a virtual machine (VM).

A VMM may provide an isolated and secure environment for a VM.

A VMM may be implemented in software or with a combination of hardware and software.

A physical resource may include one or more configurable functions. For example, a wireless network interface controller (NIC) may be configurable with respect to device initialization, network scanning, network access point selection, channel selection, connection establishment, handover management, security, and power control.

Techniques have been developed to virtualize wired NICs, including software-based VMMs and NIC hardware virtualization support based on a single root I/O virtualization (SR-IOV) specification (v1.0), promulgated by the Peripheral Component Interconnect Special Interest Group (PCI-SIG).

A software-based VMM approach may shield configurable device features from VMs.

An SR-IOV approach may improve NIC performance but will add hardware complexity and cost.

BRIEF DESCRIPTION OF THE DRAWINGS/FIGURES

Figure 1:
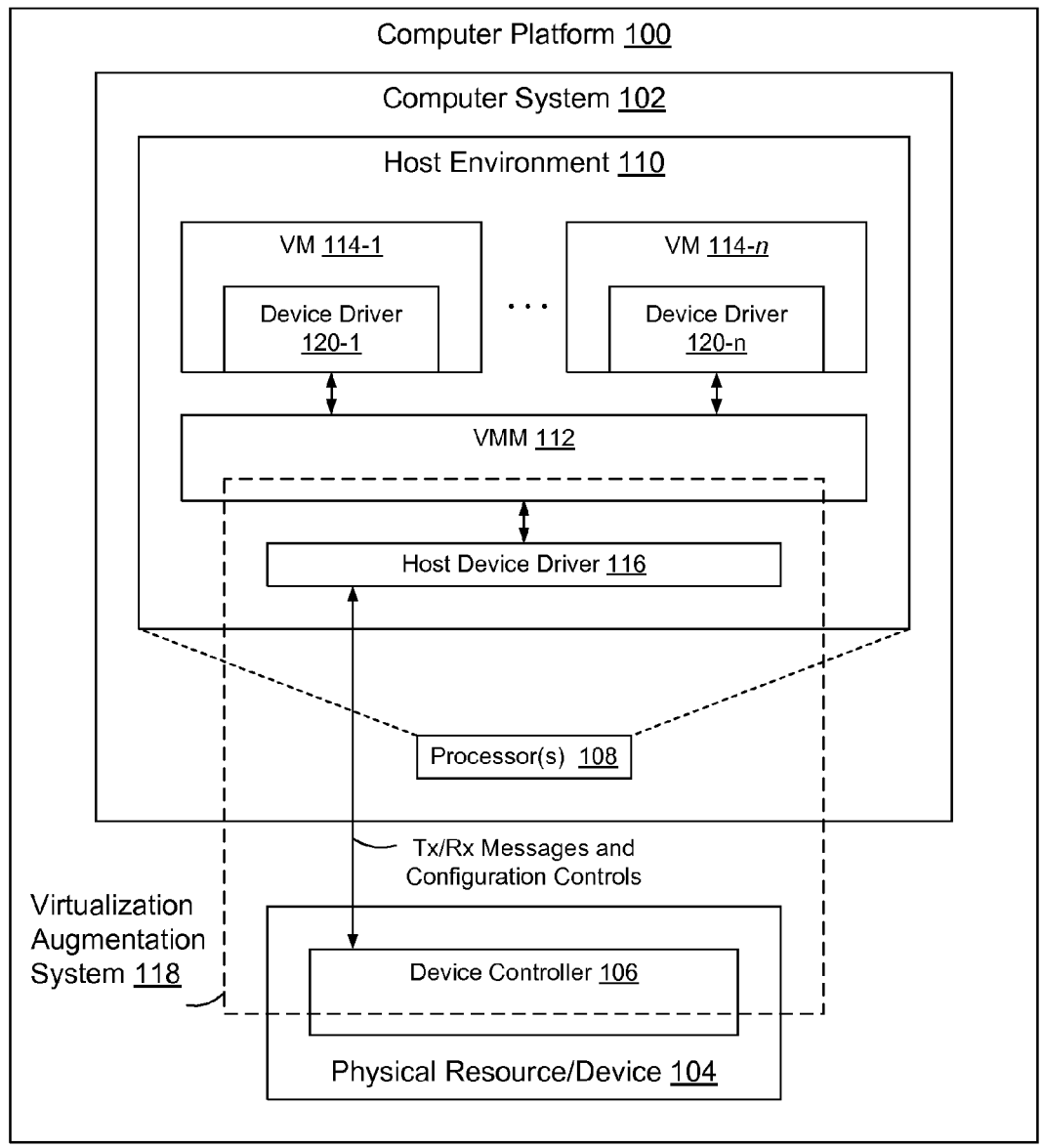
FIG. 1 is a block diagram of a computer platform including a computer system, a configurable physical resource or device, and a virtualization augmentation system to permit each of a plurality of virtual machines to configure and access the physical device.

In the drawings, the leftmost digit(s) of a reference number identifies the drawing in which the reference number first appears.

DETAILED DESCRIPTION

Disclosed herein are methods and systems to permit each of a plurality of virtual machines (VMs) to separately configure and access a physical resource or device, and methods and systems to implement the physical device to differentiate amongst multiple VMs of a host computer system.

FIG. 1 is a block diagram of a computer platform 100 including a computer system 102, a configurable physical resource or device 104, and a virtualization augmentation (VA) system 118 to permit each of a plurality of virtual machines of computer system 102 to configure and access physical device 104.

Physical device 104 may include a device controller 106 to configure one or more functions or features of physical device 104.

Physical device 104 may include one or more of a variety of types of physical devices or resources. For example, physical device 104 may include a wireless transceiver, and device controller 106 may include a wireless network interface controller (NIC). Physical device 104 and device controller 106 are not, however, limited to a wireless NIC.

Computer system 102 may include one or more processors 108 to provide a processor execution environment, referred to herein as a host environment 110. Host environment 110 may include a virtual machine monitor (VMM) 112 to host one or more virtual machines (VMs) 114-1 through 114-n.

Device controller 106 may include another processor, which may include a microcontroller, to execute instructions or logic, which may be provisioned in firmware.

Host environment 110 may include a host device driver 116 to interface between computer system 102 and physical device 104. Host device driver 116 may execute on processor 108 outside of VMM 112.

VA system 118 may be configured to permit each of VMs 114-1 through 114-n to separately configure and access physical device 104.

VMs 114 may each include an instance of a device driver 120, to expose controllable functions of the physical device within each of VMs 114-1 through 114-n. Device driver 120 may be designed specifically for physical device 104 and/or device controller 106, and may be provided by a manufacturer of physical device 104 and/or device controller 106. Device driver 120 may be referred to herein as a native device driver.

VA system 118, or portions thereof, may be implemented within device controller 106 and/or within computer system 102. Within computer system 102, one or more portions of VA system 118 may be implemented within VMM 112 and/or outside of VMM 112, such as within host device driver 116.

Where a portion of VA system 118 is implemented within device controller 106, device controller 106 may be referred to herein as a virtualization-augmented device controller.

Where a portion of I/O interface system 112 is implemented within host device driver 116, host device driver 116 may be referred to herein as a virtualization-augmented host device driver.

Figure 2:
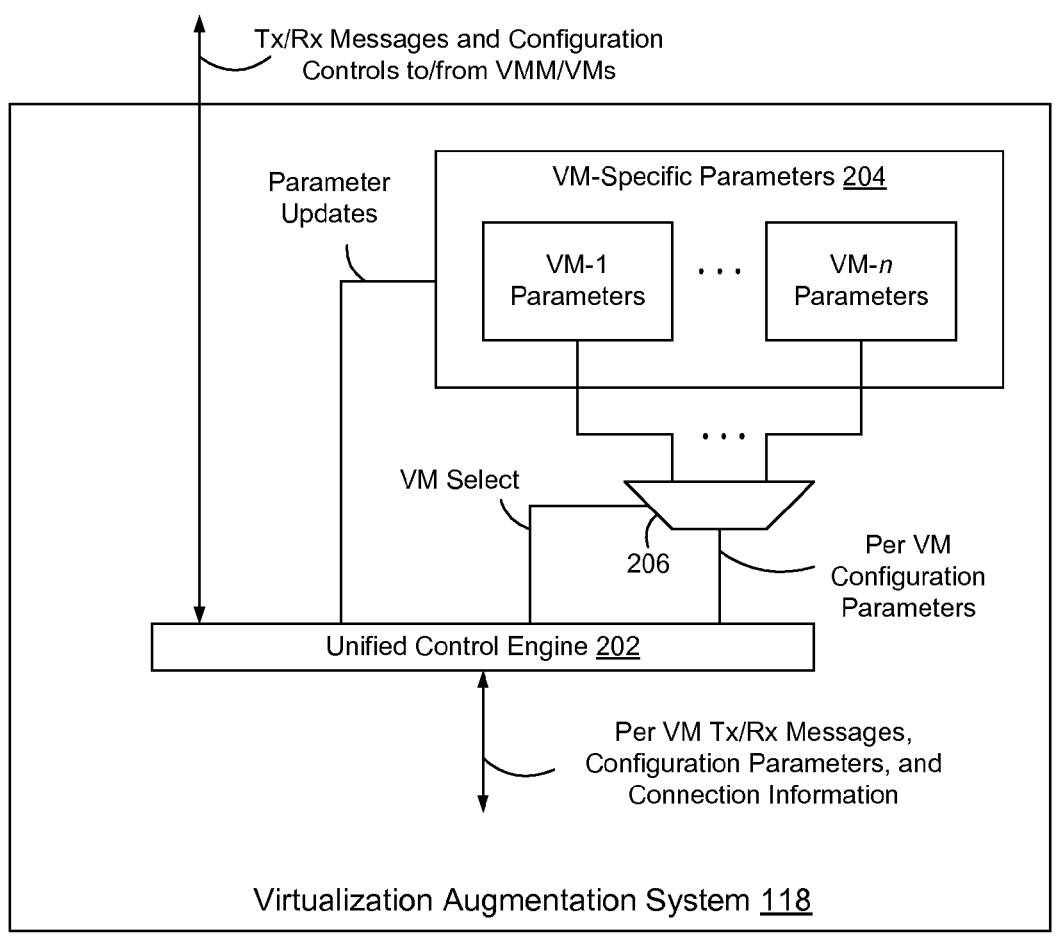
FIG. 2 is a conceptual block diagram of the virtualization augmentation (VA) system.

FIG. 2 is a conceptual block diagram of virtualization augmentation system 118, including a unified control engine 202 to manage commands and/or data sent from VMs 114-1 through 114-n to physical device 104 (FIG. 1). Unified control engine 202 may provide a unified control interface to physical device 104. For example, unified control engine 202 may be configured to synthesize control and/or configuration commands from VMs 114-1 through 114-n, such as to select and/or disregard control and/or configuration commands from different ones of VMs 114-1 through 114-n, which may be based on priority, nature of commands, potential conflicts, and/or other factors.

Unified control engine 202 may be configured to maintain VM-specific parameters 204 for each of VMs 114-1 through 114-n, and to selectively apply VM-specific parameters 204 to physical device 104. Selective application of VM-specific parameters 204 is functionally illustrated in FIG. 2 with a multiplexer 206.

Parameters 204 may include one or more of device configuration parameters and/or connection information. Types of device configuration parameters and connection information may vary by physical device type.

Where physical device 104 includes a wireless NIC, for example, configuration parameters may relate to one or more of:
  device initialization;
  network scanning;
  network/access point selection;
  channel selection;
  connection establishment;
  handover management;
  network synchronization;
  data rate selection;
  security/encryption; and
  power control.

Alternatively, or additionally, a wireless NIC may be configurable with respect to one or more of:
  authentication;
  bandwidth management;
  access control/priority;
  sub-net roaming;
  buffering;
  request-to-send and clear-to-send (RTS/CTS); and
  Quality-of-Service (QoS) (e.g., bandwidth management based on user profiles, such as access priorities).

The example configuration parameters listed above are provided for illustrative purposes, and are not exhaustive. Methods and systems disclosed herein are not limited to the example listing of controllable features above.

Regarding connection information, where physical device 104 includes a wireless NIC, connection information may include, for example, access point MAC address, VM-specific MAC address, data rates supported by the access point, channel that the access point operates on, and/or security keys specific to a connection or session.

Connection information may also include state information. Where physical device 104 includes a wireless transceiver, state information may include, for example, an association state and/or a state of a rate scaling algorithm.

Connection information associated with a particular VM connection may be stored and/or updated when access to physical device 104 is transferred from the VM to another VM. The connection information may be re-applied when the VM later accesses physical device 104.

Control module 202 may be configured to coordinate transmit and receive messages between VMs 114 and physical device 104, and to permit each of VMs 114-1 through 114-n to separately access physical device 104 based on corresponding VM-specific parameters 204. Control module 202 may be configured to permit VMs 114-1 through 114-n to separately access physical device 104 in a time-multiplexed fashion.

Control module 202, or portions thereof, may be implemented within host device driver 116 (FIG. 1), and/or within device controller 106 (FIG. 1), such as with firmware embedded instructions or logic to execute on a microcontroller.

Figure 3:
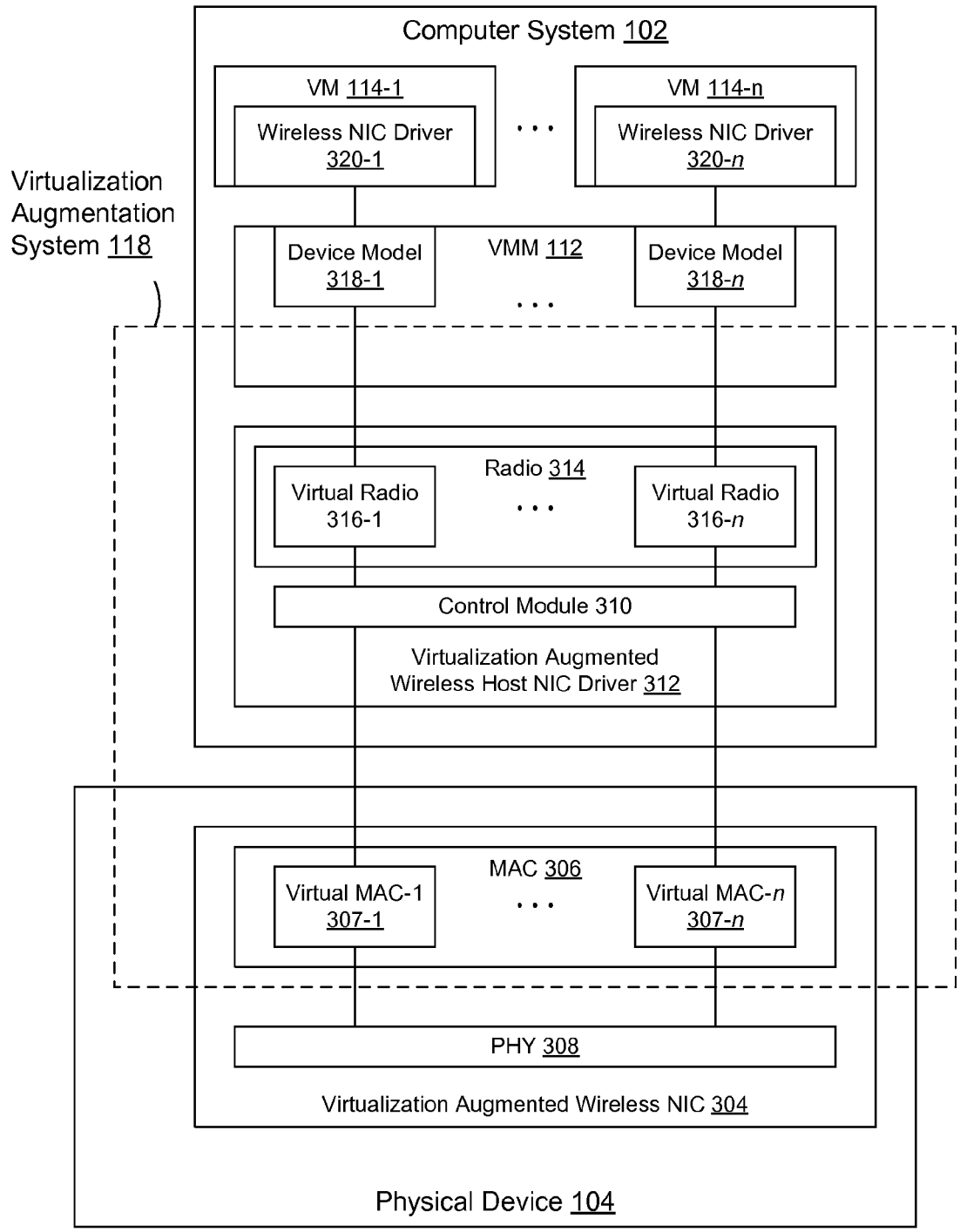
FIG. 3 is a block diagram of the computer platform, wherein the physical device includes a virtualization-augmented wireless network interface controller (NIC).

FIG. 3 is a block diagram of computer system 102 and physical device 104, wherein physical device 104 includes a virtualization-augmented wireless NIC 304, computer system 102 includes a virtualization-augmented host wireless NIC driver 312, and VA system 118 is illustrated as implemented across NIC 304, host wireless NIC driver 312, and VMM 112.

Wireless NIC 304 may include a medium access controller (MAC) 306, and a physical layer portion or device (PHY) 308 to interface between MAC 306 and a wireless transceiver. MAC 306 may be reconfigurable to present a virtual instance of MAC 306 to each of VMs 114-1 through 114-n, illustrated here as virtual MACs 307-1 through 307-n, each of which may be defined by corresponding VM-specific device parameters 204 (FIG. 2).

VMs 114-1 through 114-n may include corresponding native wireless NIC drivers 320-1 through 320-n.

Host wireless NIC driver 312 may provide an interface between MAC 306 and VMM 112, illustrated here as a radio 314. Host wireless NIC driver 312 may be configured to present a virtual instance of radio 314 for each of VMs 114-1 through 114-n, illustrated here as virtual radios 316-1 through 316-n, which may be defined by corresponding VM-specific configuration and context parameters.

Host wireless NIC driver 312 may include a control module 310, which may execute on processor 108, outside of VMM 112. Control module 310 may be configured to consolidate device configuration controls from VMs 114-1 through 114-n to present a unified control interface to wireless NIC 304.

VMM 112 may include a device model corresponding to wireless NIC 304, and may be configured to expose virtual instances of the device model to wireless NIC drivers 320-1 through 320-n, illustrated here as device models 318-1 through 318-n. The device model may include emulated peripheral component interconnect (PCI) functions.

Wireless NIC device drivers 320, device models 318, and host wireless NIC driver 312 may be configured to permit VMs 114 to access all or a subset of configurable functions of physical device 104.

Figure 4:
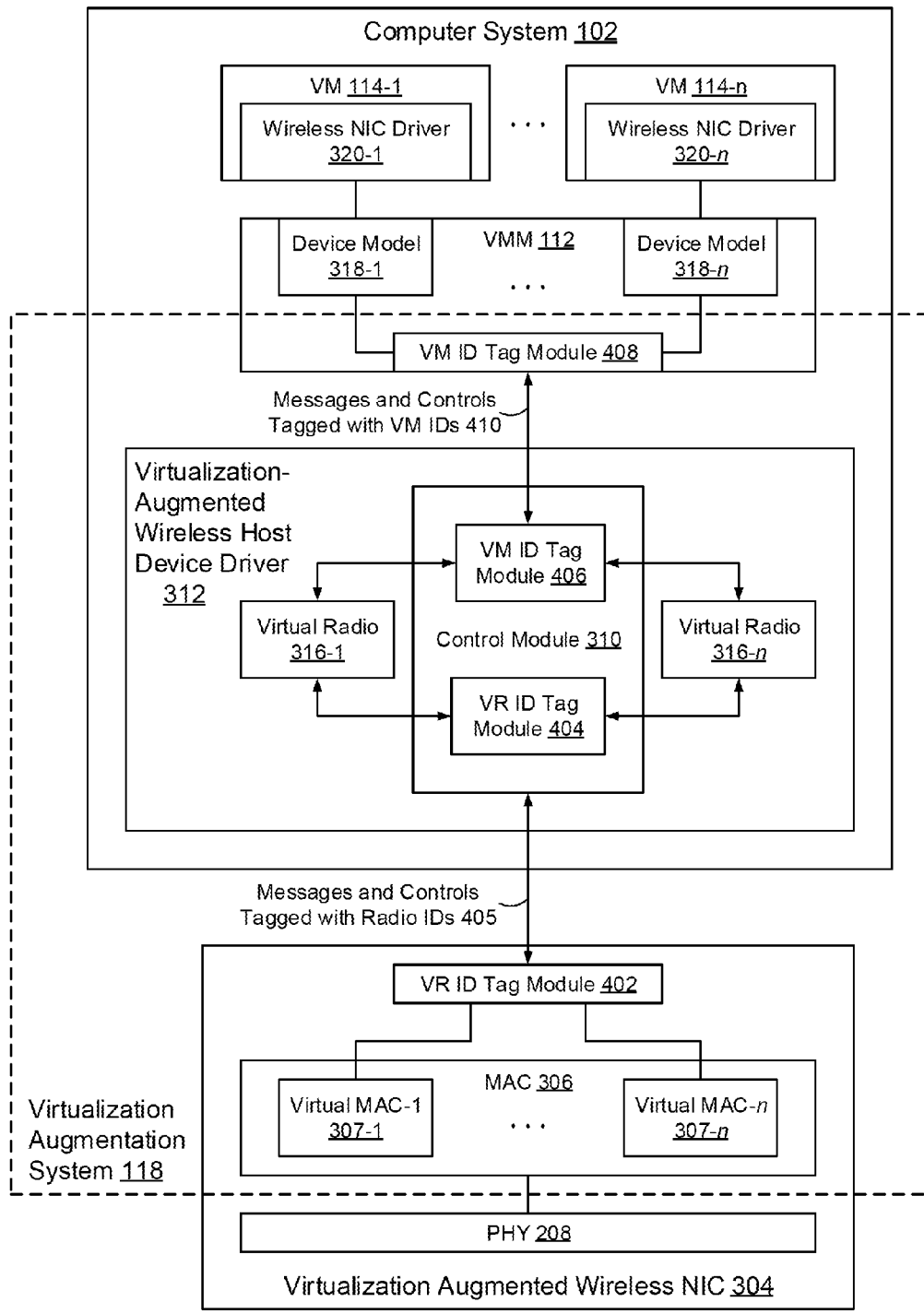
FIG. 4 is a block diagram of the computer platform, as presented in FIG. 3, wherein the VA system is configured to associate VM identifiers with messages and controls passed between the VMM and the physical device.

FIG. 4 is a block diagram of computer system 102 and physical device 104, as presented in FIG. 3, wherein VA system 118 is configured to associate VM-specific identifiers with messages and controls passed amongst VMM 112, host wireless NIC driver 312, and wireless NIC 304. This is referred to herein as tagging messages with VM-specific identifiers.

In FIG. 4, wireless NIC 304 includes a virtual radio identifier, or VR ID tag module 402, and host wireless NIC driver 312 includes a VR ID tag module 404. VR ID tag modules 402 and 404 are each configured to tag messages and controls 405 sent between wireless NIC 304 and host wireless NIC driver 312 with appropriate VM-specific VR ID tags.

MAC 306 is further configured to process messages received from host wireless NIC driver 312 with selected ones of virtual MACs 307-1 through 307-n, based on the associated VR ID tags.

Similarly, host wireless NIC driver 312 is further configured to process messages received from wireless NIC 304 with selected ones of virtual radios 316-1 through 316-n, based on the associated VR ID tags.

Host wireless NIC driver 312 further includes a VM ID tag module 406, and VMM 112 includes a VM ID tag module 408. VM ID tag modules 406 and 408 are each configured to tag messages and controls 410 sent between host wireless NIC driver 312 and VMM 112 with appropriate VM ID tags.

Host wireless NIC driver 312 is further configured to pass messages received from VMM 112 through selected ones of virtual radios 316-1 through 316-n, based on the associated VM ID tags.

Similarly, VMM 112 is configured to pass messages received from host wireless NIC driver 312 to selected ones of VMs 114-1 through 114-n, based on the associated VM ID tags.

Figure 5:
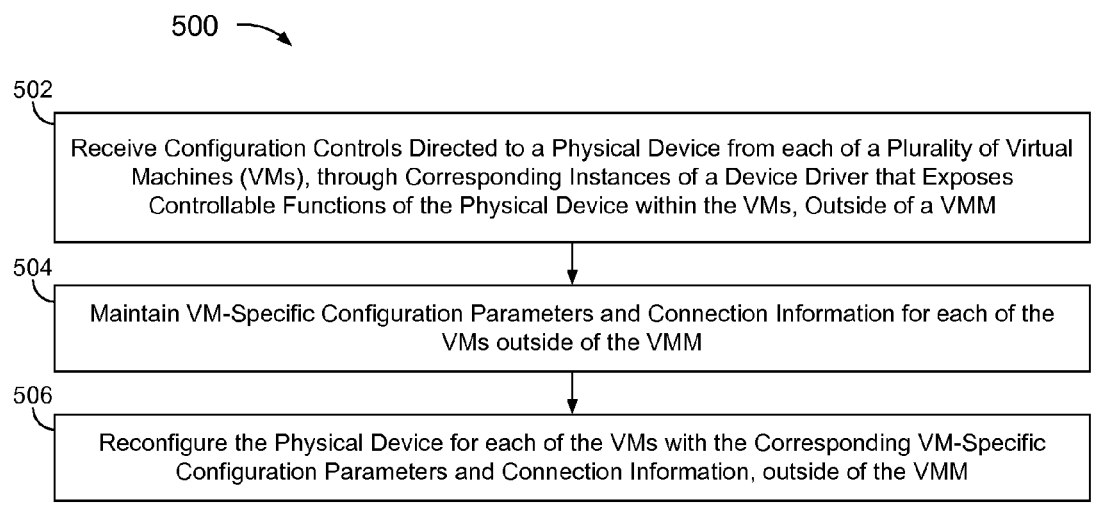
FIG. 5 is a flowchart of a method of interfacing between a physical device and a plurality of VMs.

FIG. 5 is a flowchart of a method 500 of interfacing between a physical device and a plurality of VMs.

At 502, configuration controls directed to a physical device are received from a plurality of VMs, through corresponding instances of a device driver that exposes controllable functions of the physical device within the VMs.

At 504, VM-specific configuration parameters and VM-specific connection information are maintained for each of the VMs, such as described in one or more examples herein.

At 506, the physical device is reconfigured for each of the VMs with the corresponding VM-specific configuration parameters and connection information, such as described in one or more examples herein.

The receiving of configuration controls at 502, the maintaining of VM-specific configuration parameters and VM-specific connection information at 504, and the reconfiguring of the physical device at 506, may be performed substantially outside of a VMM that hosts the VMs, such as described in one or more examples herein.

The maintaining of VM-specific configuration parameters and VM-specific connection information at 504, and the reconfiguring of the physical device at 506, may be performed substantially within the physical device.

The physical device may include a wireless NIC, and the reconfiguring at 506 may include reconfiguring the wireless NIC for each of the plurality of VMs with respect to one or more of parameters described above.

The example configuration parameters listed above are provided for illustrative purposes. Method 500 is not limited to the example listing of controllable features above.

Methods and systems to differentiate amongst VMs with respect to configuration controls to and from the VMs, and with respect to data traffic are described below with reference to FIGS. 6 through 9. The methods and systems are described with reference to a wireless NIC. The methods and systems are not, however, limited to a wireless NIC.

Figure 6:
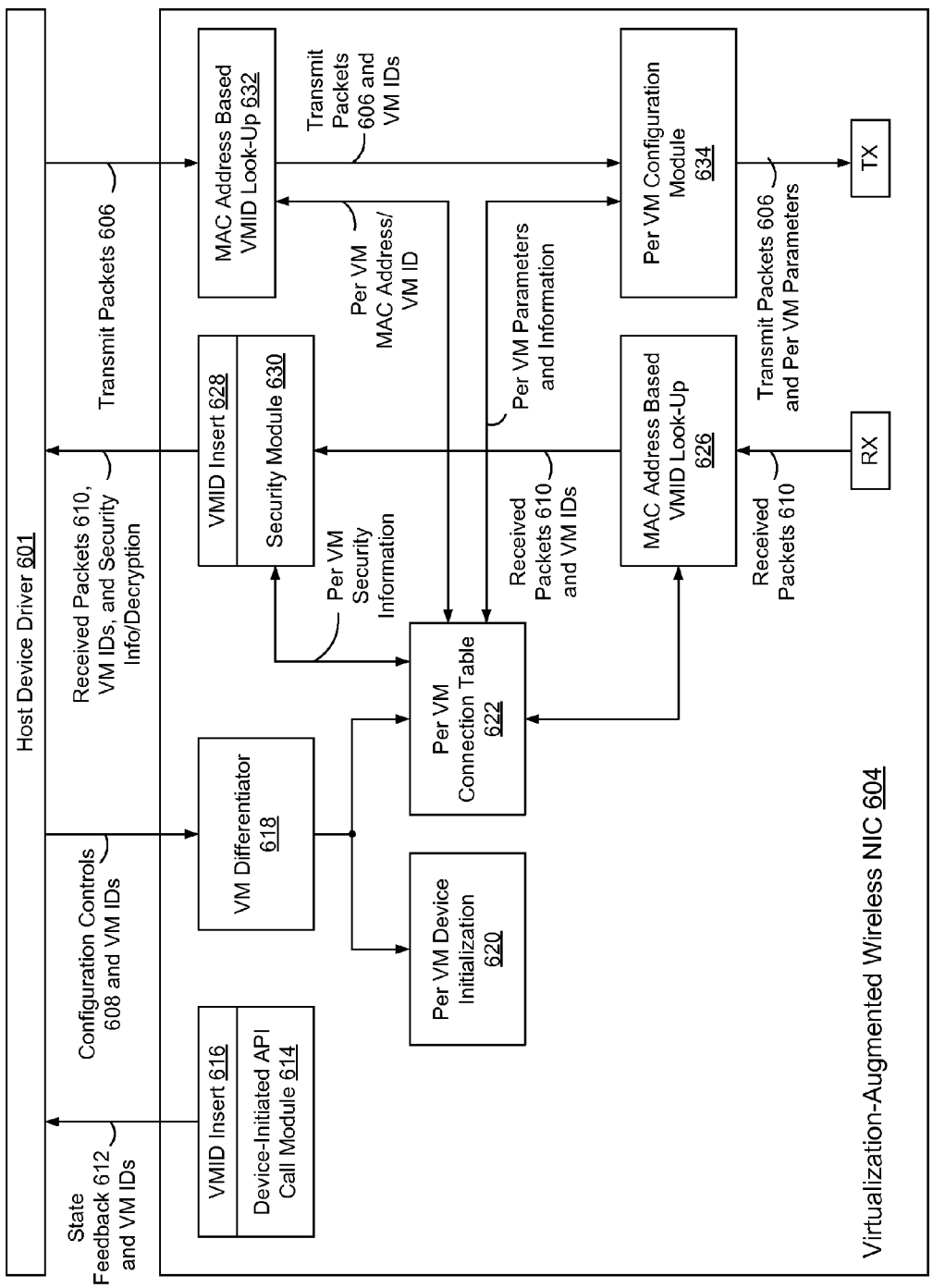
FIG. 6 is a block diagram of a wireless NIC, reconfigurable for multiple VMs, and configured to differentiate amongst VMs with respect to configuration controls and data traffic to and from the VMs.

FIG. 6 is a block diagram of a wireless NIC 604, reconfigurable for multiple VMs, and configured to differentiate amongst the VMs with respect to configuration controls and data traffic. Wireless NIC 604 may correspond to physical device 104 in FIG. 1, and is described below with respect to FIG. 1. Wireless NIC 604 is not, however, limited to the example of FIG. 1.

Host device driver 601 may be configured to send transmit packets 606 and configuration controls 608 from VMs 114-1 through 114-n (FIG. 1), to wireless NIC 604. Wireless NIC 604 may be configured to send received packets 610 and state feedback 612 to host device driver 601 for delivery to corresponding VMs 114-1 through 114-n.

Transmit packets 606, configuration controls 608, received packets 610, and state feedback 612, may be tagged with appropriate VM identifiers (VM IDs) to permit wireless NIC 604 and host device driver 601 to handle and/or process the packets, controls, and feedback on a per VM basis. VM IDs may relate directly to VMs and/or to virtual radios, such as described above with reference to FIG. 4.

VM ID tagging may be implemented with one or more of a plurality of techniques, and combinations thereof.

For example, host environment 110 may include a host application program interface (API) to interface between wireless NIC 604 and VMs 114-1 through 114-n. The host API may be implemented within host device driver 601. The host API may be configured with to recognize a VM identifier (VM ID) field in host API headers. The VM ID header field may be accommodated by reserved bits of an existing or conventional API header. A number of bits used for the VM ID header field may be determined by the number of VMs to be supported.

Regarding state feedback 612, wireless NIC 604 may include a device-initiated API call module 614 to call to the host API with state feedback 612. Wireless NIC 604 may further include a VM ID insert module 616 to insert VM IDs in the host API VM ID header field of state feedback 612. This may permit host device driver 601 to direct state feedback 612 to appropriate VMs.

Regarding configuration controls 608, device models within a VMM, such as device models 318 in FIGS. 3 and 4, may be configured to insert VM IDs into API control calls (configuration controls 608) issued from corresponding VMs. Wireless NIC 604 may include a VM differentiator 618 to receive configuration controls 608, and to identify associated VMs 114 from the API VM ID header fields.

VM differentiation of received packets 610 and transmit packets 606 is described further below.

Wireless NIC 604 may be configured to handle and/or process configuration controls 608 on a per VM basis based on the associated VM IDs. Wireless NIC 604 may include, for example, a per VM device initialization module 620 to initialize a MAC and/or a PHY on a per VM basis, such as described further below. Wireless NIC 604 may also include a per VM connection table 622 to maintain per VM parameters, such as described further below.

VM differentiation is now described with respect to received packets 610.

Wireless NIC 604 may receive packets 610 from one or more access points or transceivers, which may be associated with one or more service set identifiers (SSIDs). Each received packet 610 may include a destination MAC address that is specific to one of VMs 114.

Wireless NIC 604 may include a receive-side VM ID look-up module 626 to look-up VM IDs in per VM connection table 622 based on MAC addresses of received packets 610.

Wireless NIC 604 may further include a VM ID insert module 628 to insert the identified VM IDs into API VM ID header fields of received packets 610, such as described above with reference to VM ID insert module 616.

VM IDs of received packets 610 may permit host device driver 601 to pass received packets 610 to appropriate VMs 114 substantially without processing received packets 610.

Wireless NIC 604 may include a security module 630, described further below.

VM differentiation is now described with respect to transmit packets 606.

Host environment 110 (FIG. 1) may be configured to insert VM IDs in transmit packets 606, such as described above with respect to configuration controls 608. In such a situation, configuration parameters and connection information for transmit packets 606 may be retrieved from per VM connection table 622 based on the VM IDs.

Alternatively, transmit packets 606 may be received from host device driver 601 without VM IDs. For example, host device driver 601 and/or the host API may not be configured to insert VM IDs into API headers. To accommodate such a situation, wireless NIC 604 may include a transmit-side VM ID look-up module 632 to look-up VM IDs from per VM connection table 622 based on VM-specific MAC addresses contained within transmit packets 606, such as described above with respect to receive-side VM ID look-up module 626.

Wireless NIC 604 may include a per VM configuration module 634 to retrieve VM-specific configuration parameters and connection information from per VM connection table 622 based on VM IDs identified by VMI ID look-up module 632, and to configure or reconfigure functions of wireless NIC 604 for transmit packets 606 based on the corresponding VM IDs.

Device initialization is now described.

Configuration controls 608 may include device initialization controls from multiple VMs. Device initialization control may be directed to a PHY and/or a MAC. Wireless NIC 604 may include a per VM device initialization module 620 to process device initialization controls and to avoid potential conflicting device initialization controls.

For PHY initialization, initialization module 620 may be configured to determine a current PHY state and operational channel. Initialization module 620 may be further configured to initialize the PHY only when the PHY is not currently initialized. Where a PHY initialization command specifies a channel or mode other than a current operational channel or mode, initialization module 620 may evaluate one or more factors before proceeding. Factors may include whether the new channel or mode is supported by the device, and any constraints that may be associated with the new channel or mode.

For MAC initialization, initialization module 620 may be configured to initiate a MAC instance for a particular VM when the VM first invokes or initiates a corresponding NIC driver. This may include configuring MAC filters for the virtual MAC with a MAC address of the VM in order to receive packets 610 for the VM.

Maintenance of VM-specific parameters is now described.

Per VM connection table 622 may be configured to maintain VM-specific configuration parameters and connection information, including state information, for each of multiple VMs or VM connections.

VM connection table 622 may be configured to store connection information for a particular VM when access to wireless NIC 604 is transferred from the VM to another VM, and to re-apply the connection information and corresponding configuration parameters when the VM later accesses wireless NIC 604.

VM connection table 622 and/or wireless NIC 604 may include data structures with independent entry per connection to maintain or store per VM or per connection information in association with corresponding VM IDs. Wireless NIC 604 may be configured to maintain (e.g., add, modify, or delete) the data structures with specifics associated with each VM. The data structures may include ucode data structures.

Security features are now described.

Per VM connection table 622 may be configured to store VM-specific security information for each VM or VM connection. Security information may include per VM encryption/decryption techniques, which may include for example, one or more of temporal key integrity protocol (TKIP), and computer mode with cipher block chaining message authentication code protocol (CCMP). Security information may include security keys and/or indexes to security keys with which to decode received packets 610 and/or to encode transmit packets 606.

On the receive side, security module 630 may be configured to retrieve VM-specific security decryption techniques and security keys from per VM connection table 622 based on VM IDs of received packets 610, and to decode received packets 610 with the corresponding decryption techniques and keys. Alternatively, decoding may be performed by computer system 102, and security module 630 may be configured to retrieve and forward VM-specific security key indexes with corresponding received packets 610.

On the transmit side, per VM configuration module 634 may be configured to retrieve VM-specific security encryption techniques and security keys from connection table 622 based on VM IDs of transmit packets 606, and to encode transmit packets 606 with the corresponding encryption techniques and keys.

Figure 7:
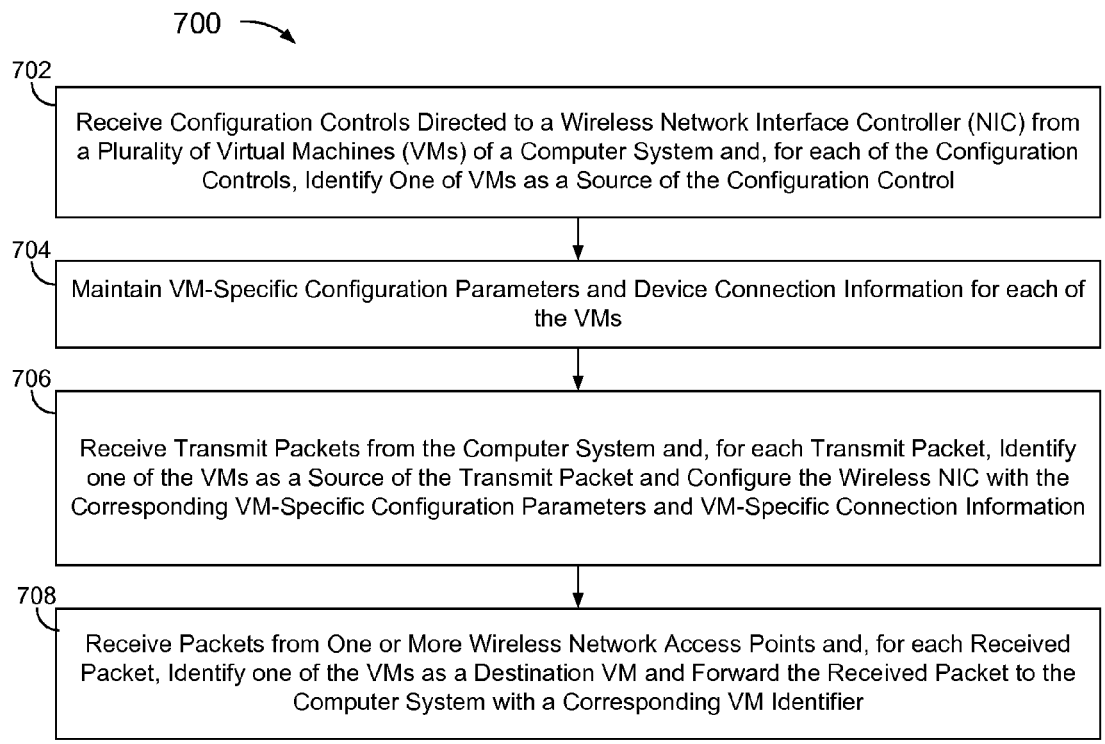
FIG. 7 is a flowchart of a method of controlling a wireless NIC to operate with respect to multiple VMs, including differentiating amongst the VMs with respect to configuration controls and data traffic to and from the VMs.

FIG. 7 is a flowchart of a method 700 of controlling a wireless NIC to operate with respect to multiple VMs, including differentiating amongst the VMs with respect to configuration controls and data traffic to and from the VMs.

At 702, configuration controls directed to a wireless NIC are received from a plurality of virtual machines (VMs) hosted by a computer system and, for each configuration control, one of the VMs is identified as a source of the configuration control.

At 704, VM-specific configuration parameters and device connection information are maintained by the NIC for each of the VMs.

At 706, transmit packets are received from the VMs and, for each of the transmit packets, one of the VMs is identified as a source of the transmit packet, and the wireless NIC is configured with the corresponding VM-specific configuration parameters and with corresponding VM-specific device connection information.

At 708, packets are received from one or more wireless access points and, for each received packet, one of the VMs is identified as a destination VM and the received packet is forwarded to the computer system with a corresponding VM identifier.

Figure 8:
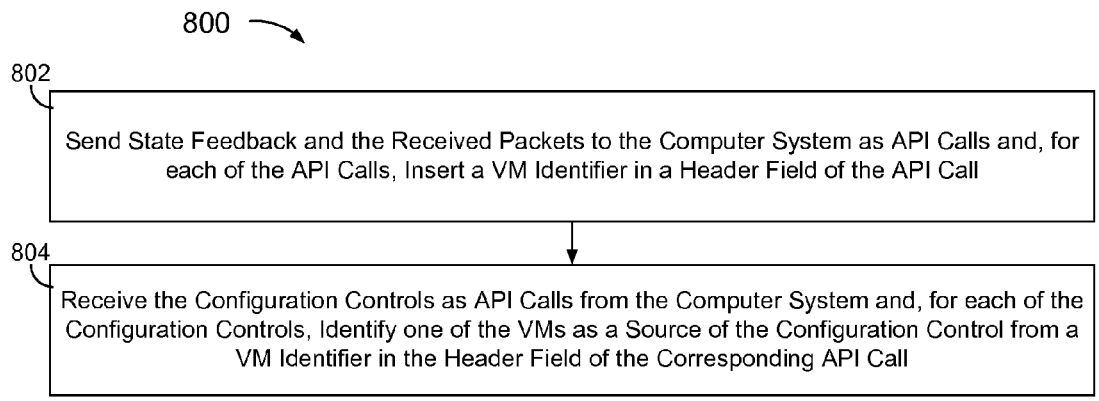
FIG. 8 is a flowchart of a method of differentiating VMs with respect to configuration controls and received packets.

FIG. 8 is a flowchart of a method 800 of differentiating VMs with respect to configuration controls and received packets. Method 800, or portions thereof, may be implemented in combination with method 700.

At 802, state feedback and received packets are sent to a computer system as API calls and, for each of the API calls, a VM identifier is inserted in a header field of the API call.

At 804, configuration controls are received from the computer system as API calls and, for each of the configuration controls, one of the VMs is identified as a source of the configuration control from a VM identifier in the header field of the corresponding API call.

Figure 9:
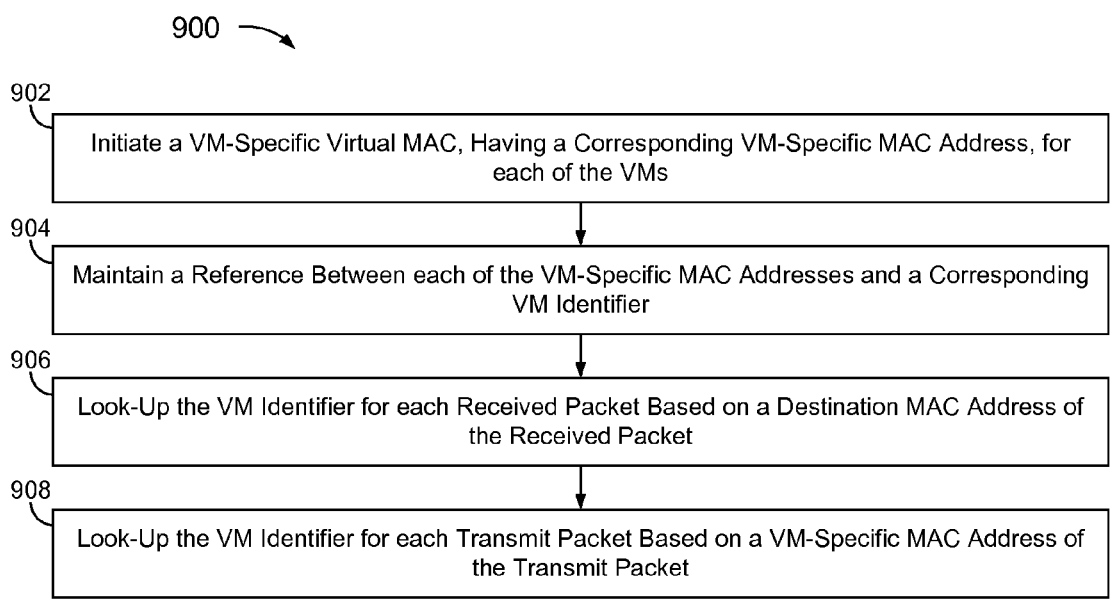
FIG. 9 is a flowchart of a method of associating VM-specific identifiers with packets received from one or more access points, and with transmit packets received from a VMM.

FIG. 9 is a flowchart of a method 900 of associating VM-specific identifiers with packets received from one or more access points, and with transmit packets received from a computer system. Method 900, or portions thereof, may be implemented in combination with method 700 and/or method 800.

At 902, a VM-specific virtual MAC is initiated for each of a plurality of VMs. Each virtual MAC is configured with a corresponding VM-specific MAC address.

At 904, a reference is maintained between each of the VM-specific MAC addresses and a corresponding VM identifier.

At 906, a VM identifier is looked-up for each received packet based on a destination MAC address of the received packet.

At 908, a VM identifier is looked-up for each transmit packet based on a VM-specific MAC address of the transmit packet.

On the receive side, when the VM identifier may be used to look-up security information with which to decode the received packet. The received packet may be decrypted by the wireless NIC, or may be sent to the computer system with a security key index, such as described in one or more examples herein.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. The terms software, code, and instructions, as used herein, refers to a computer program product including a computer readable medium having computer program logic stored therein to cause a computer system to perform one or more functions in response thereto.

Figure 10:
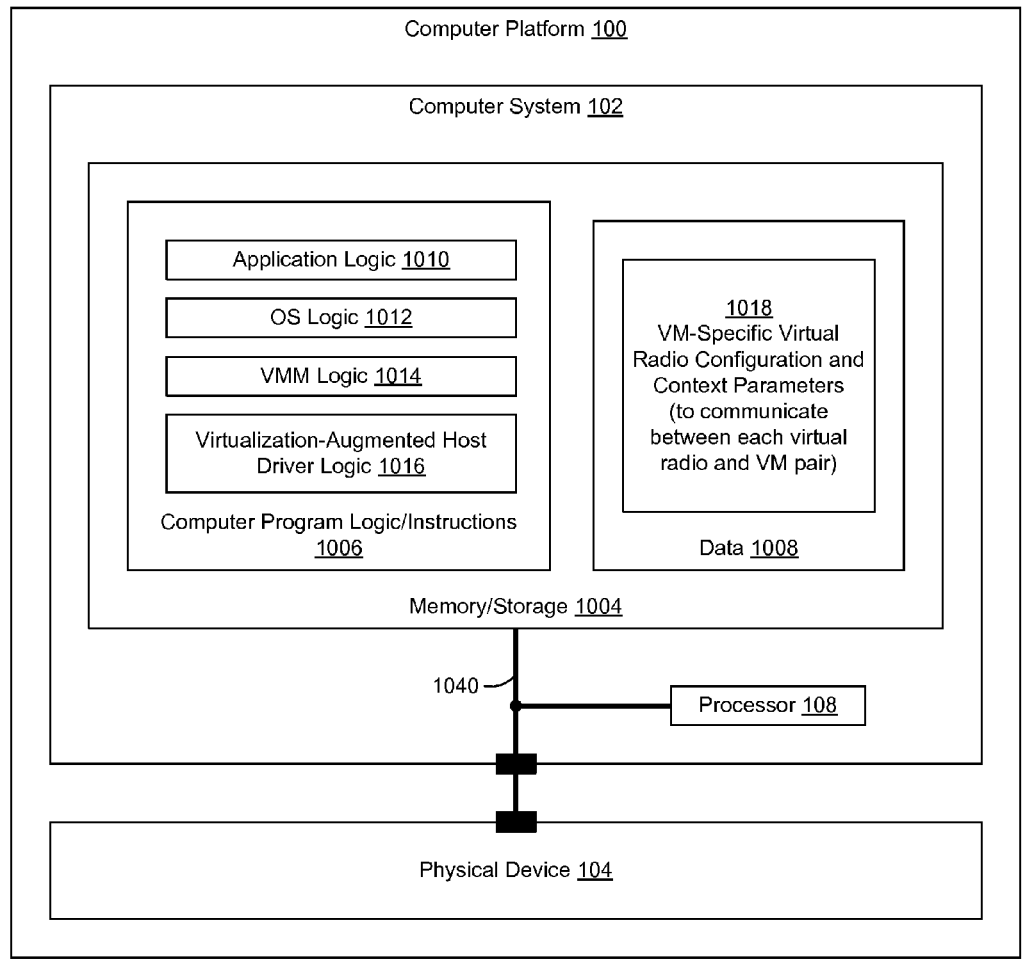
FIG. 10 is a block diagram of the computer platform of FIG. 1, including example features of the computer system.

FIG. 10 is a block diagram of computer platform 100 of FIG. 1, including example features of computer system 102.

In the example of FIG. 10, computer system 102 includes processor 108 to execute computer program product logic (hereinafter, "logic"). Processor 108 may represent multiple processors.

Computer system 102 may include one or more of memory, cache, registers, and storage, together illustrated here as memory 1004. Memory 1004 may include a computer program product including a computer readable medium having computer program logic or instructions 1006 stored thereon to cause processor 108 to perform one or more functions in response thereto. Example logic is described below.

Memory 1004 may include data 1008 to be used by processor 108 in executing logic 1006, and/or generated by processor 108 in response to execution of logic 1006.

Logic 1006 may include application logic 1010 to cause processor 108 to perform one or more application tasks.

Logic 1006 may include operating system logic 1012 to cause processor 108 to provide an operating environment for application logic 1010.

Logic 1006 may include VMM logic 1014 to cause processor 108 to execute operating system logic 1012 within a virtual machine.

Logic 1006 may include virtualization-augmented host device driver logic 1016 to cause processor 108 to interface between physical device 104 and a virtual machine monitor, such as described in one or more examples herein.

Host device driver logic 1016 may include logic to cause processor 108 to configure multiple VM-specific virtual radios, and data 1008 may include corresponding VM-specific virtual radio configuration and context parameters 1018.

Computer system 102 may include a communications infrastructure 1040 to interface amongst devices within computer system 102 and to communicate with physical device 104.

Figure 11:
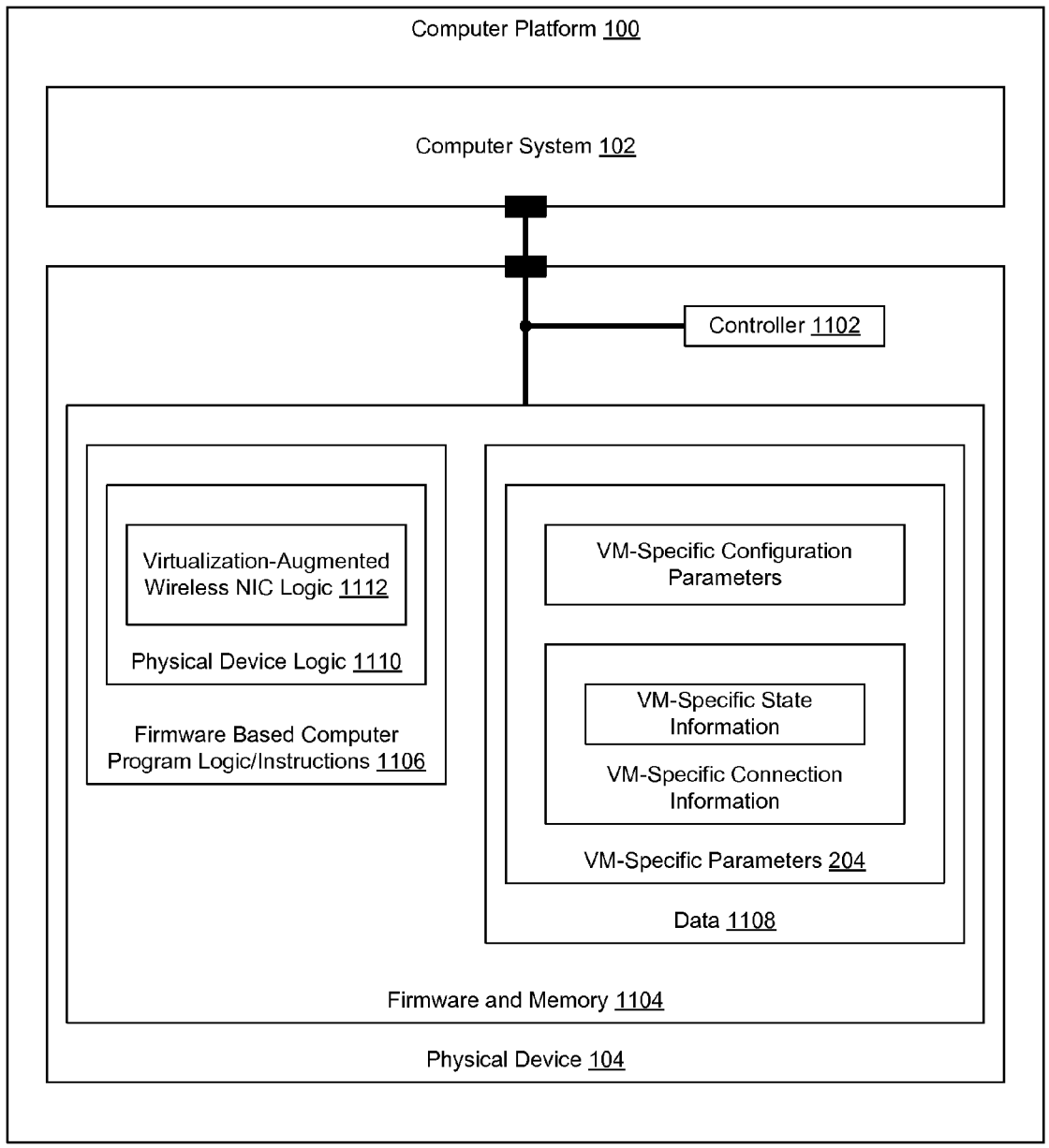
FIG. 11 is another block diagram of the computer platform of FIG. 1, including example features of the physical device.

FIG. 11 is a block diagram of computer platform 100 of FIG. 1, including example features of physical device 104.

Physical device 104 may include one or more computer instruction processing units, illustrated here as a controller 1102, to execute computer program product logic. Controller 1102 may include a micro-controller.

Physical device 104 may include one or more of memory, cache, registers, and storage, together referred to hereinafter as memory 1104. Memory 1104 may include a computer program product including a computer readable medium having computer program logic 1106 stored thereon, to cause controller 1102 to perform one or more functions in response thereto. Logic 1106 may be provisioned in firmware, and may be copied to memory at run-time. Example logic is disclosed below.

Memory 1104 may include data 1108 to be used by controller 1102 in executing logic 1106, and/or generated by controller 1102 in response to execution of logic 1106.

Logic 1106 may include physical device logic 1110 to cause controller 1102 to maintain VM-specific parameters 204 for each of multiple VMs of computer system 102, and to reconfigure physical device 104 with VM-specific parameters 204, such as described in one or more examples herein.

Physical device logic 1110 may include virtualization-augmented wireless NIC logic 1112 to cause controller 1102 to perform as a virtualization-augmented wireless NIC, such as described in one or more examples above.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. An apparatus, comprising:
a processor and memory of a computer system configured to expose configurable functions of a physical device within virtual machines (VMs) hosted by a virtual machine monitor (VMM), through device drivers of the respective VMs, execute a host device driver outside of the VMM to receive physical device configuration controls from the device drivers of the respective VMs through the VMM and consolidate the physical device configuration controls to provide a unified control interface to the physical device; and
a processor and memory of the physical device configured to maintain the physical device configuration controls and connection information for each of the VMs external of the VMs and external of the VMM, and reconfigure the physical device for each of the VMs with the physical device configuration controls and connection information of the respective VMs, external of the VMs and external of the VMM.

2. The system of claim 1, wherein:
the physical device includes a wireless network interface controller (NIC);
the wireless NIC includes a media access controller (MAC); and
the processor and memory of the physical device are further configured to reconfigure the MAC for each of the VMs with the physical device configuration controls and connection information of the respective VMs.

3. The system of claim 2, wherein:
the host device driver includes a radio interface to interface between the wireless NIC and the VMM; and
the radio interface is reconfigurable for each of the VMs with the physical device configuration controls and connection information of the respective VMs.

4. The system of claim 3, wherein:
the MAC is configured to send packets and controls to the host device driver with VM-specific radio-specific identifiers; and
the host device driver is further configured to convert between radio-specific identifiers and VM-specific identifiers to communicate packets and controls between the VMM and the MAC.

5. The system of claim 2, wherein the processor and memory are further configured to reconfigure the MAC for each of the VMs with respect to one or more of,
device initialization,
network scanning,
network point selection,
channel selection,
connection establishment,
handover management,
network synchronization,
data rate selection,
security, and
power control.

6. A method, comprising:
exposing configurable functions of a physical device within virtual machines (VMs) hosted by a virtual machine monitor (VMM) through device drivers of the respective VMs, on a processor of a computer system;
executing a host device driver on the processor of the computer system outside the VMM to receive physical device configuration controls from the device drivers of the respective VMs through the VMM and to consolidate the physical device configuration controls to provide a unified control interface to the physical device;
maintaining the physical device configuration controls and connection information for each of the VMs on a processor of the physical device, external of the VMs and external of the VMM, and
reconfiguring the physical device for each of the VMs on the processor of the physical device with the physical device configuration controls and connection information of the respective VMs, external of the VMs and external of the VMM.

7. The method of claim 6, wherein the physical device includes a wireless network interface controller (NIC), wherein the wireless NIC includes a media access controller (MAC), and wherein the reconfiguring includes:
reconfiguring the MAC for each of the VMs with the physical device configuration controls and connection information of the respective VMs.

8. The method of claim 7, wherein the host device driver includes a radio interface to interface between the wireless NIC and the VMM, and wherein the reconfiguring further includes:
reconfiguring the radio interface for each of the VMs with the physical device configuration controls and connection information of the respective VMs.

9. The method of claim 8, wherein the MAC is configured to send packets and controls to the host device driver with VM-specific radio-specific identifiers, the method further including:
converting between the VM-specific radio identifiers and VM-specific VM identifiers by the host device driver to communicate packets and controls between the VMM and the MAC.

10. The method of claim 7, wherein the reconfiguring includes reconfiguring the MAC for each of the VMs with respect to one or more of,
device initialization,
network scanning,
network point selection,
channel selection,
connection establishment,
handover management,
network synchronization,
data rate selection,
security, and
power control.

11. A non-transitory computer readable medium encoded with a computer program that includes:
instructions to cause a processor of a computer system to expose configurable functions of a physical device within virtual machines (VMs) hosted by a virtual machine monitor (VMM) through device drivers of the respective VMs, execute a host device driver outside of the VMM to receive physical device configuration controls from the device drivers of the respective VMs through the VMM and consolidate the physical device configuration controls to provide a unified control interface to the physical device; and
instructions to cause a processor of the physical device to maintain the physical device configuration controls and connection information for each of the VMs external of the VMs and external of the VMM, and reconfigure the physical device for each of the VMs with the physical device configuration controls and connection information of the respective VMs, external of the VMs and external of the VMM.

12. The non-transitory computer readable medium of claim 11, wherein:
the physical device includes a wireless network interface controller (NIC);
the wireless NIC includes a medium access controller (MAC); and
the computer program further includes instructions to cause the processor of the NIC to reconfigure the MAC for each of the VMs with the physical device configuration controls and connection information of the respective VMs.

13. The non-transitory computer readable medium of claim 12, wherein the host device driver includes instructions to cause the processor of the computer system to:
provide a radio interface between the wireless NIC and the VMM;
reconfigure the radio interface for each of the VMs with the configuration controls and connection information of the respective VMs.

14. The non-transitory computer readable medium of claim 13, wherein the MAC is configured to send packets and controls to the host device driver with VM-specific radio-specific identifiers, and wherein the host device driver includes instructions to cause the processor of the computer system to:

convert between radio-specific identifiers and VM-specific identifiers to communicate packets and controls between the VMM and the MAC.

15. The non-transitory computer readable medium of claim 12, further including instructions to cause a processor of the physical device to reconfigure the MAC for each of the VMs with respect to one or more of, device initialization,
    network scanning,
    network point selection,
    channel selection,
    connection establishment,
    handover management,
    network synchronization,
    data rate selection,
    security, and
    power control.

\* \* \* \* \*